(12) United States Patent
Chen

(10) Patent No.: US 8,079,384 B2
(45) Date of Patent: Dec. 20, 2011

(54) SPOOL SEAT WITH A POSITIONING STRUCTURE

(75) Inventor: Mei-Li Chen, Tanzih Township, Taichung County (TW)

(73) Assignee: Kuching International Co., Ltd., Tanzih Township, Taichung County (TW)

( * ) Notice: Subject to any disclaimer, the term of this patent is extended or adjusted under 35 U.S.C. 154(b) by 881 days.

(21) Appl. No.: 12/111,060

(22) Filed: Apr. 28, 2008

(65) Prior Publication Data
US 2009/0266432 A1  Oct. 29, 2009

(51) Int. Cl.
*F16K 11/078* (2006.01)
(52) U.S. Cl. ..................... 137/625.4; 251/363
(58) Field of Classification Search ............ 137/625.4, 137/625.3, 625.31, 625.41; 251/208, 205, 251/360, 363
See application file for complete search history.

(56) References Cited

U.S. PATENT DOCUMENTS

| | | | | |
|---|---|---|---|---|
| 4,793,375 A | * | 12/1988 | Marty | 137/270 |
| 5,402,827 A | * | 4/1995 | Gonzalez | 137/625.17 |
| 5,853,023 A | * | 12/1998 | Orlandi et al. | 137/271 |
| 6,202,693 B1 | * | 3/2001 | Bollo | 137/625.17 |
| 6,892,761 B2 | * | 5/2005 | Chen | 137/625.4 |
| 7,373,950 B2 | * | 5/2008 | Huang | 137/625.17 |
| 7,850,088 B2 | * | 12/2010 | Wei et al. | 236/12.1 |

\* cited by examiner

*Primary Examiner* — John Rivell
*Assistant Examiner* — Seth Faulb
(74) *Attorney, Agent, or Firm* — Egbert Law Offices PLLC

(57) ABSTRACT

The present invention provides a spool seat with a positioning structure, which resolves the shortcomings of the assembly of a typical spool ceramic disc and spool seat. The spool seat of the present invention is provided with a chamber space for locating the fixed ceramic disc. The chamber space is provided with an internal locating portion which comprises an internal locating flange and external locating flange. An external locating portion is protruded from the chamber space. The chamber space is divided into inlet space and outlet space via the arrangement of internal locating portion. It is possible to eliminate the space restrictions for the fixed ceramic disc, and also prevent the rotation and slide or displacement when the fixed ceramic disc is assembled into the chamber space of the spool seat.

1 Claim, 5 Drawing Sheets

SPOOL SEAT WITH A POSITIONING STRUCTURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a spool seat, and more particularly to an innovative spool seat with a positioning structure.

2. Description of Related Art Including Information Disclosed Under 37 CFR 1.97 and 37 CFR 1.98

The spool seat of a typical water control valve for positioning the spool ceramic disc is shown in FIG. 1. A locating portion 3 is arranged within the spool seat 2 for positioning the spool ceramic disc 1. However, there are shortcomings are observed during actual applications.

Given the fact that the inner diameter of a typical spool seat 2 is $\Phi B$, the locating portion 3 for fixation of the spool ceramic disc 1 is generally protruded towards an inner side of the spool seat 2. Thus, the available space of the spool seat 2 is shown in FIG. 1, wherein only the space of $\Phi A$ can be used for assembly and positioning of the spool ceramic disc 1, leading to the waste of remaining space ($\Phi B - \Phi A$).

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

There is enhanced efficacy of the present invention.

With the arrangement of an internal locating portion, the chamber space could be divided and utilized efficiently. As compared with the prior art structures, the spool seat of the present invention is structurally coupled with the fixed ceramic disc for better applicability. Moreover, when the fixed ceramic disc is assembled into the chamber space of the spool seat, the internal locating flange and external locating flange of the internal locating portion restricts the limiting portion of the fixed ceramic disc. The external locating portion is used to prevent the rotation and slide or displacement of the fixed ceramic disc.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
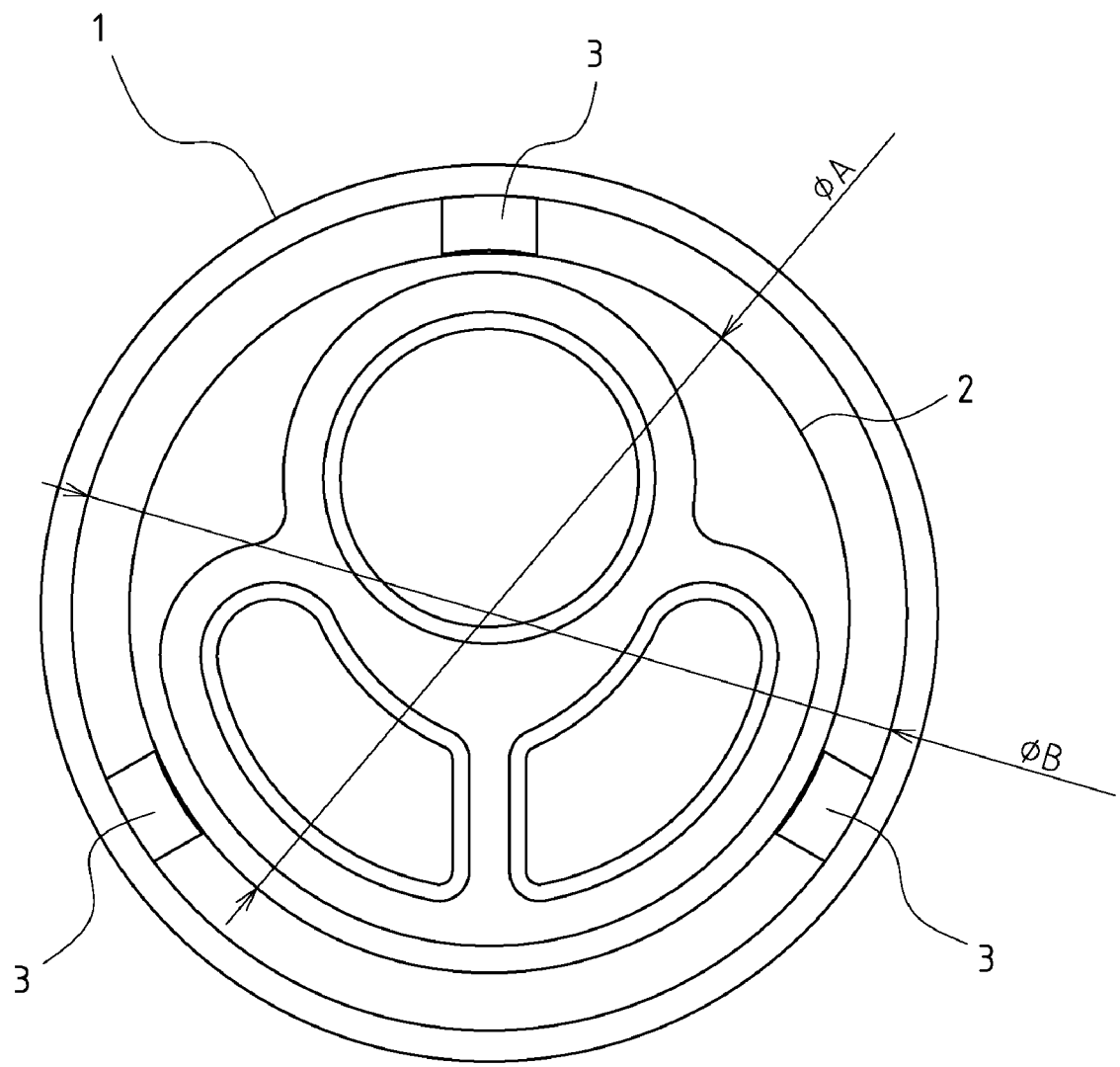
FIG. 1 depicts a top plan view of the typical structure.
Figure 2:
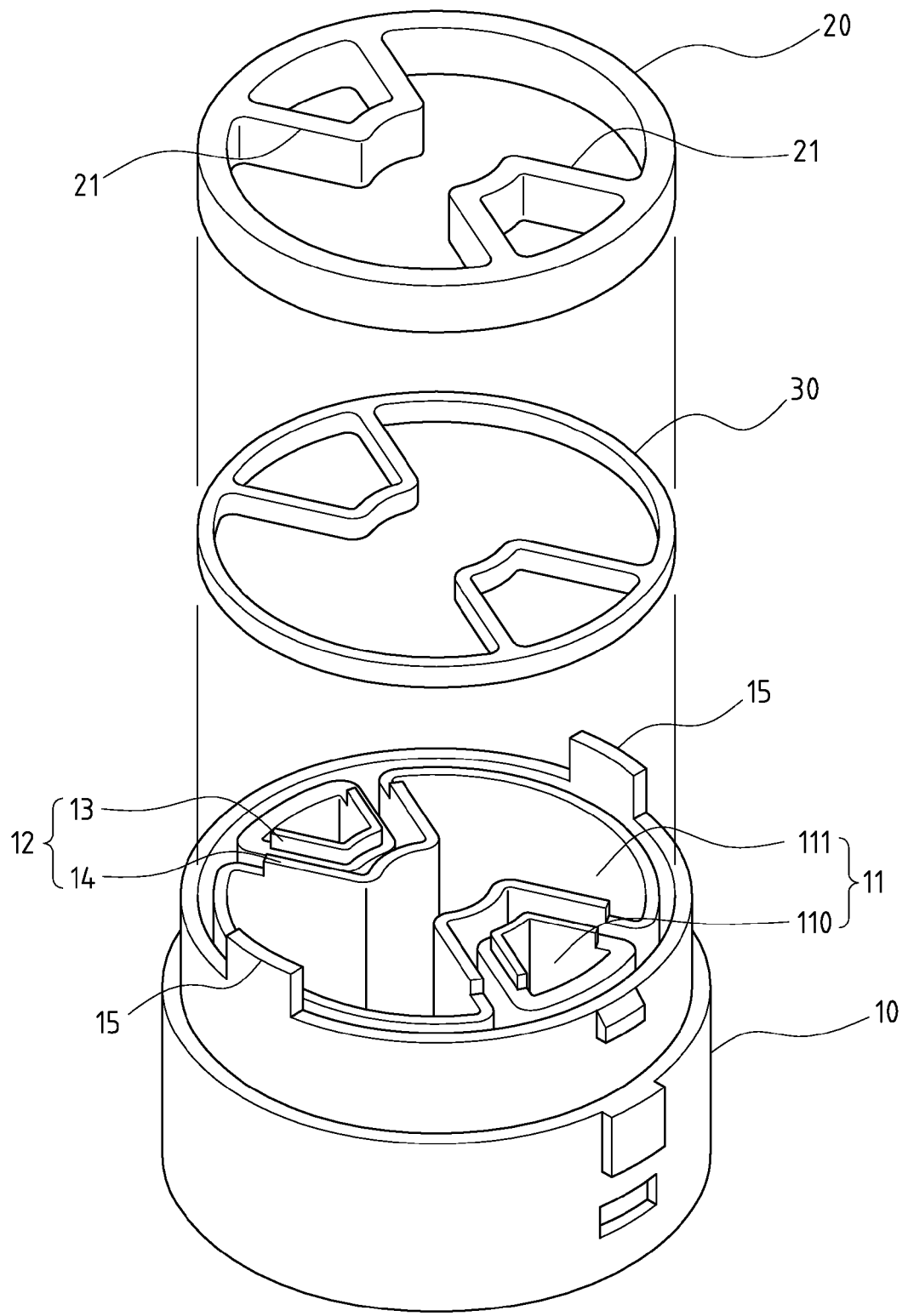
FIG. 2 depicts an exploded perspective view of the present invention.
Figure 3:
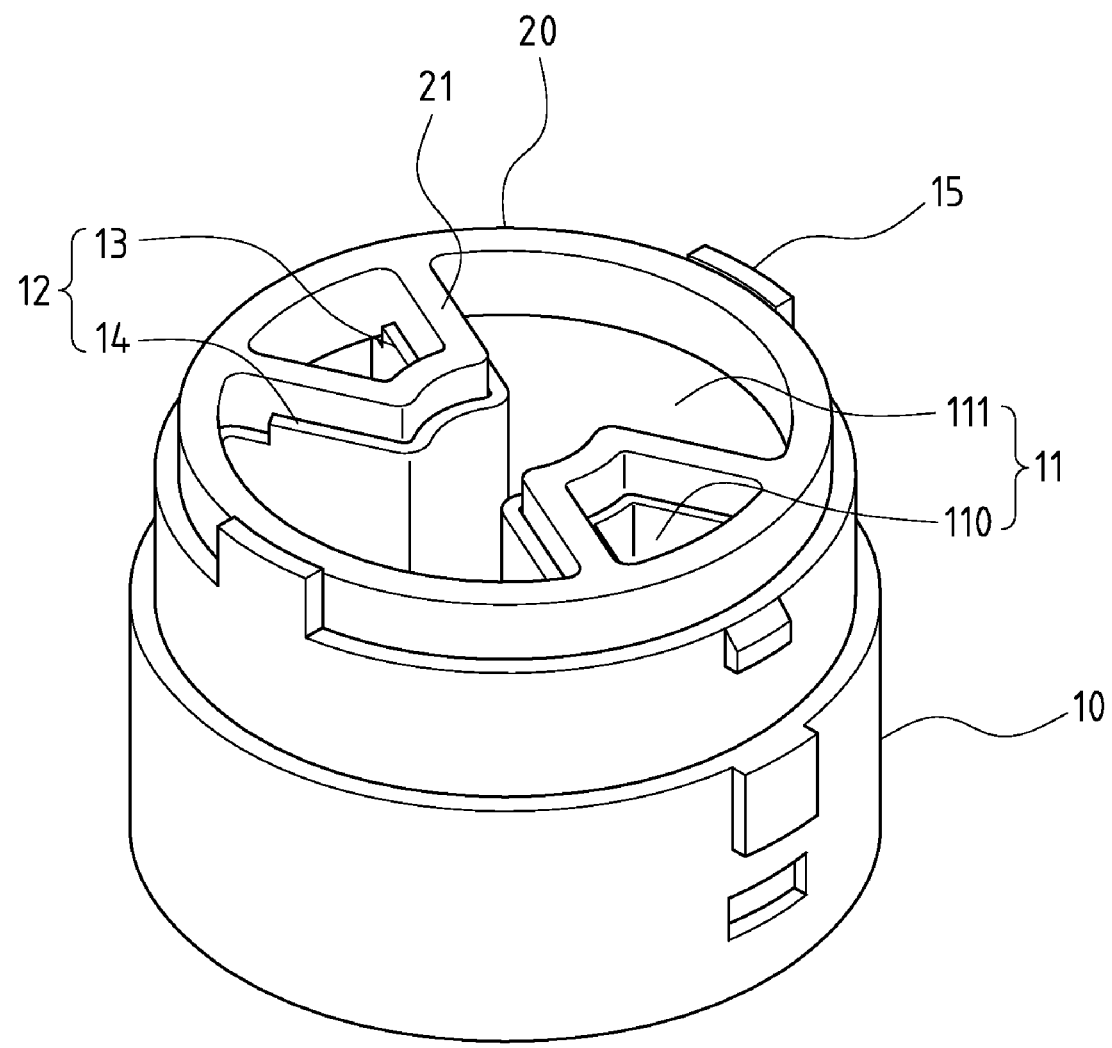
FIG. 3 depicts an assembled perspective view of the present invention.
Figure 4:
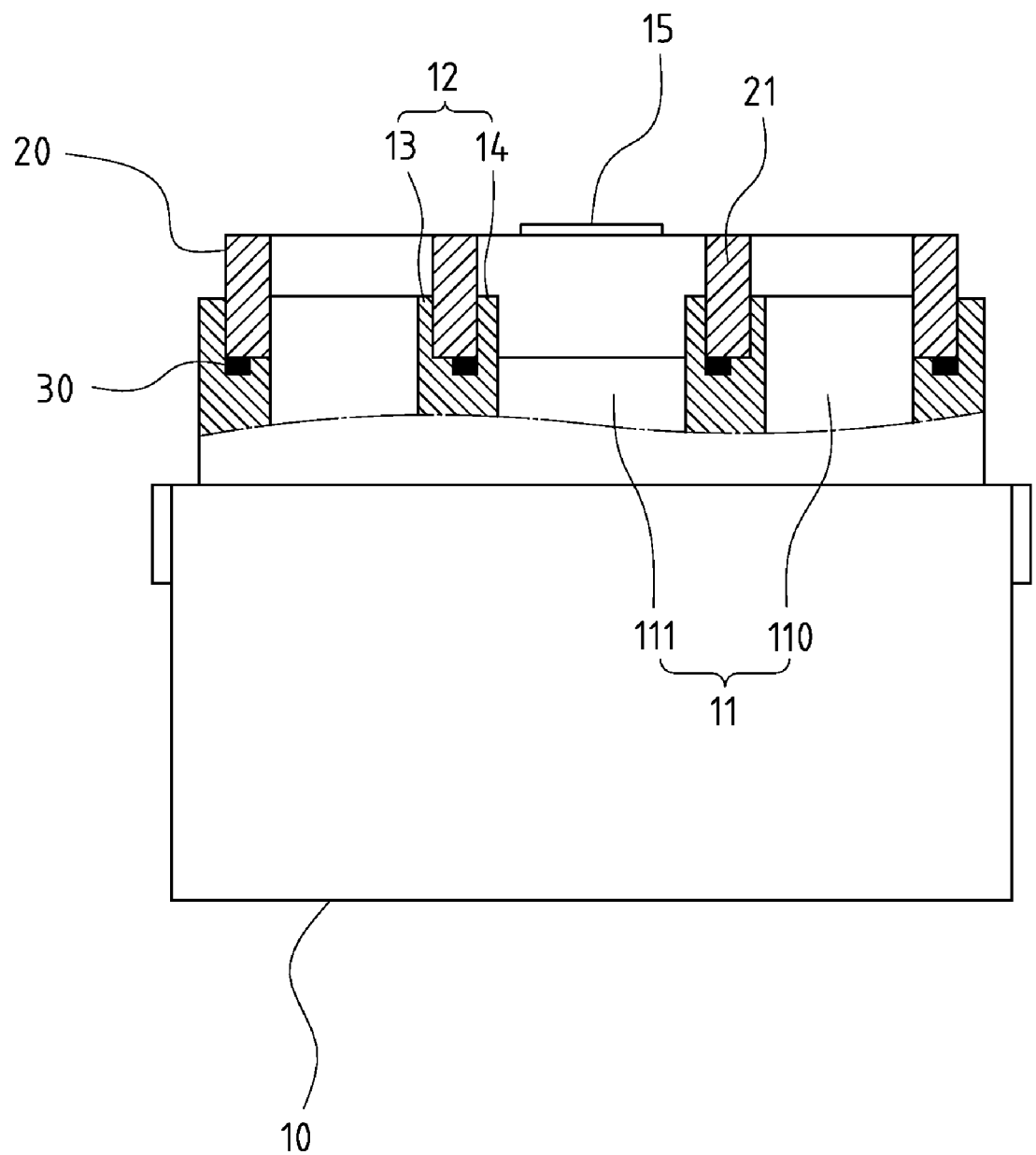
FIG. 4 depicts an assembled sectional view of the present invention.

FIGS. 2-4 depict preferred embodiments of the positioning structure of the spool seat of the present invention. The embodiments are provided only for explanatory purposes with respect to the patent claims.

A chamber space 11 is defined in the spool seat 10 for locating a fixed ceramic disc 20. The chamber space 11 is provided with an internal locating portion 12, which comprises an internal locating flange 13 and an external locating flange 14. An external locating portion 15 is protruded from the chamber space 11, preventing rotation and displacement during assembly of fixed ceramic disc 20.

With the arrangement of internal locating portion 12, the chamber space 11 can be divided into inlet space 110 and outlet space 111.

The fixed ceramic disc is implanted (FIG. 4) or embedded (FIG. 5) into the internal locating portion.

Based upon above-specified structures, the present invention is operated as follows:

The fixed ceramic disc 20 is also provided with two corresponding limiting portions 21 in matching the internal locating portion 12 of the spool seat 10. A sealing gasket 30 is preset into the internal locating portion 12. Then, the fixed ceramic disc 20 is mated with the spool seat 10. When two limiting portions 21 of the fixed ceramic disc 20 are assembled into the internal locating portion 12, the internal locating flange 13 and external locating flange 14 of the internal locating portion 12 restricts the limiting portions 21 to prevent the rotation of fixed ceramic disc 20. When the fixed ceramic disc 20 is assembled into the spool seat 10, the external locating portion 15 protruded on the chamber space 11 could limit and prevent slide or displacement of the fixed ceramic disc 10.

Figure 5:
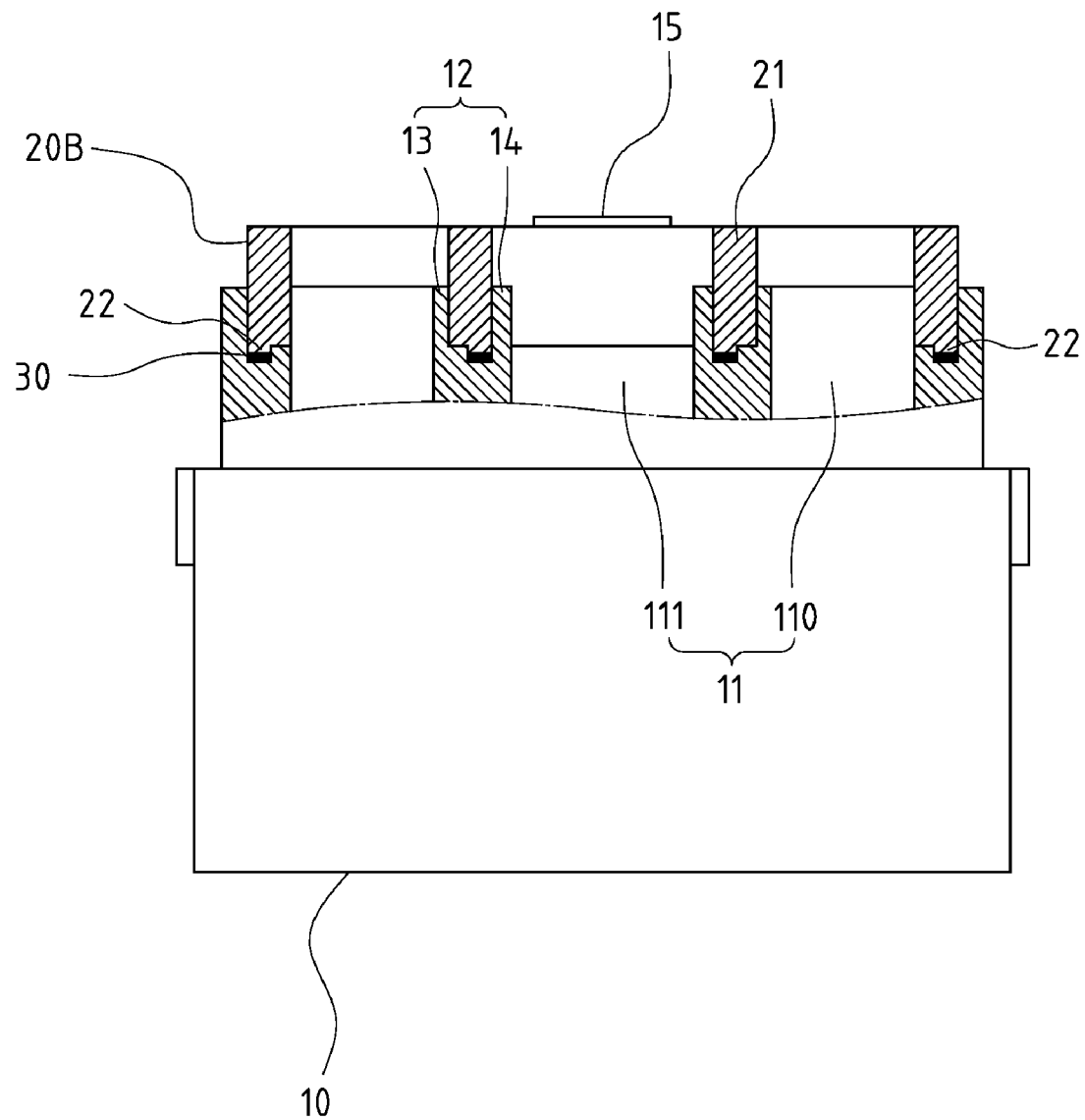
FIG. 5 depicts a partially sectional view of another preferred embodiment of the present invention.

FIG. 5 depicts another preferred embodiment of the present invention, wherein the fixed ceramic disc 20B is coupled with the internal locating portion 12. The bottom edge of the fixed ceramic disc 20 is provided with a bulge 22, so that the fixed ceramic disc 20B can be embedded into the internal locating portion 12.

Additionally, the external locating portion also permits a caulking groove to be placed externally onto the chamber space, and a protruding portion is arranged correspondingly onto the fixed ceramic disc for fixation purposes.

I claim:
1. A positioning assembly comprising:

a spool seat having a chamber space therein, said chamber space having an inlet space defined by a channel formed in said chamber space, said channel having a end, said chamber space having an outlet space defined by a wall formed in said chamber space, said wall having a first curved portion and a second curved portion, said wall having a first inwardly extending portion and a second inwardly extending portion formed at opposite ends of and respectively between said first and second curved portions, each of said first and second inwardly extending portions having inwardly tapered generally planar sides with a section extending between ends of said generally planar sides, said channel having internal flanges extending upwardly from said end thereof, said wall of said outlet space having end portions at said first and second inwardly extending portions extending in generally parallel spaced relation to said flanges of said channel; and a ceramic disc positioned on said end of said channel and a portions received respectively between said flanges of said channel and said end portions of said first and second inwardly extending portions so as to prevent rotation of said ceramic disc with respect to said spool seat.

* * * * *